(12) United States Patent
Xue et al.

(10) Patent No.: US 8,983,530 B2
(45) Date of Patent: *Mar. 17, 2015

(54) DATA SESSION CONTINUITY BETWEEN WIRELESS NETWORKS

(71) Applicant: Sprint Communications Company L.P., Overland Park, KS (US)

(72) Inventors: Wen Xue, Overland Park, KS (US); Suryanarayanan Ramamurthy, Olathe, KS (US); Jay Douglas Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/102,766

(22) Filed: Dec. 11, 2013

(65) Prior Publication Data

US 2014/0098790 A1    Apr. 10, 2014

Related U.S. Application Data

(63) Continuation of application No. 13/555,397, filed on Jul. 23, 2012, now Pat. No. 8,639,233.

(51) Int. Cl.
*H04M 1/00* (2006.01)
*H04W 36/00* (2009.01)
*H04M 3/00* (2006.01)

(52) U.S. Cl.
CPC ............ *H04W 36/0022* (2013.01); *H04M 3/00* (2013.01); *H04W 36/00* (2013.01)
USPC .................. 455/550.1; 455/552.1; 455/426.1; 370/338

(58) Field of Classification Search
CPC . H04M 1/72519; H04W 8/245; H04W 88/06; H04W 84/12
USPC .................. 455/550.1, 552.1, 426.1; 370/338
See application file for complete search history.

(56) References Cited

U.S. PATENT DOCUMENTS

| | | | |
|---|---|---|---|
| 8,374,631 B2 | 2/2013 | Kall et al. | |
| 2008/0305792 A1 | 12/2008 | Khetawat et al. | |
| 2010/0279681 A1* | 11/2010 | Ahmad et al. | 455/424 |
| 2010/0296483 A1 | 11/2010 | Sayeedi et al. | |
| 2010/0309843 A1 | 12/2010 | Mahendran et al. | |
| 2011/0216743 A1 | 9/2011 | Bachmann et al. | |
| 2011/0219082 A1 | 9/2011 | Kim | |
| 2012/0113971 A1 | 5/2012 | Giaretta et al. | |
| 2012/0120933 A1 | 5/2012 | Schatzmayr | |
| 2012/0329515 A1* | 12/2012 | Husted et al. | 455/552.1 |
| 2013/0059526 A1* | 3/2013 | Moore et al. | 455/3.06 |
| 2013/0259218 A1* | 10/2013 | Borislow et al. | 379/207.13 |
| 2013/0316746 A1* | 11/2013 | Miller et al. | 455/466 |
| 2014/0040421 A1* | 2/2014 | Baldwin | 709/217 |
| 2014/0040488 A1* | 2/2014 | Small et al. | 709/228 |

* cited by examiner

*Primary Examiner* — Danh Le

(57) ABSTRACT

Embodiments disclosed herein provide systems and methods to provide data session continuity between wireless networks. In a particular embodiment, a method provides receiving a request to create a data session for a wireless communication device exchanging communications with a wireless local area network via a wireless access point. The method further provides determining an access point identifier for the wireless access point and selecting a control system for a cellular communication network of a plurality of cellular communication networks based on the access point identifier. The method further provides anchoring the data session to the control system.

20 Claims, 7 Drawing Sheets

| SSID ANCHOR TABLE 700 | |
|---|---|
| SSID | ANCHOR |
| A | PGW |
| B | PGW |
| C | HA |
| D | PGW |
| ... | ... |

FIGURE 7

DATA SESSION CONTINUITY BETWEEN WIRELESS NETWORKS

RELATED CASES

This patent application is a continuation of U.S. patent application Ser. No. 13/555,397 that was filed on Jul. 23, 2012 and that is entitled "DATA SESSION CONTINUITY BETWEEN WIRELESS NETWORKS." U.S. patent application Ser. No. 13/555,397 is hereby incorporated by reference into this patent application.

TECHNICAL BACKGROUND

The use of cellular communication networks to exchange data communications with wireless devices can be supplemented with wireless local area networks (LANs), such as a personal WIFI network. The use of wireless LANs over cellular communication networks is beneficial because a wireless LAN may provide faster data transfer speeds and is not subject to a cellular network operator's bandwidth usage restrictions, among other reasons. Thus, a wireless device capable of communicating with wireless LANs and cellular networks will typically select a wireless LAN for data communications when a wireless LAN is accessible.

However, wireless LANs usually have a much smaller wireless signal coverage area when compared to cellular communication networks. Accordingly, a wireless device may easily move beyond the coverage area of a wireless LAN, which necessitates the use of a cellular communication network to exchange data communications. Since wireless LANs and cellular networks use different gateways to provide access to the internet, a wireless device in the middle of a data communication session will lose the data session when the device moves from a wireless LAN to a cellular network.

OVERVIEW

Embodiments disclosed herein provide systems and methods to provide data session continuity between wireless networks. In a particular embodiment, a method provides receiving a request to create a data session for a wireless communication device exchanging communications with a wireless local area network via a wireless access point. The method further provides determining an access point identifier for the wireless access point and selecting a control system for a cellular communication network of a plurality of cellular communication networks based on the access point identifier. The method further provides anchoring the data session to the control system.

BRIEF DESCRIPTION OF THE DRAWINGS

FIG. 7 illustrates an SSID anchor table to provide data session continuity between wireless networks.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
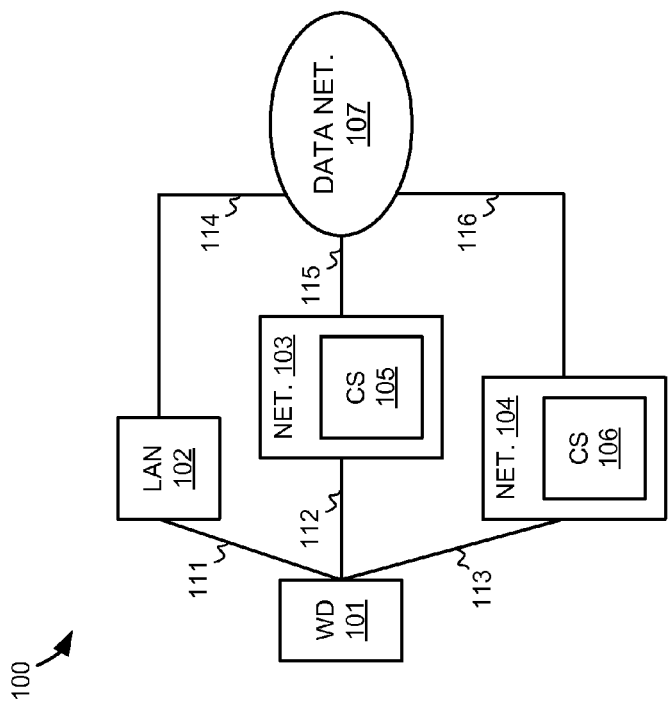
FIG. 1 illustrates a wireless communication system to provide data session continuity between wireless networks.

FIG. 1 illustrates wireless communication system 100. Wireless communication system 100 includes wireless communication device 101, wireless local area network (LAN) 102, cellular communication network 103, cellular communication network 104, communication control system 105, communication control system 106, and data network 107. Wireless communication device 101 and wireless LAN 102 communicate over wireless link 111. Wireless communication device 101 and cellular communication network 103 communicate over wireless link 112. Wireless communication device 101 and cellular communication network 104 communicate over wireless link 113. Wireless LAN 102 and data network 107 communicate over communication link 114. Cellular communication network 103 and data network 107 communicate over communication link 115. Cellular communication network 104 and data network 107 communicate over communication link 116.

In operation, wireless device 101 is a multimode device that is capable of communicating wirelessly with wireless LAN 102 and cellular networks 103-104. For example, wireless device 101 may use Wireless Fidelity (WIFI) or some other wireless LAN protocol to communicate with wireless LAN 102. Wireless device 101 may use Code Division Multiple Access (CDMA), Evolution Data Only (EVDO), Worldwide Interoperability for Microwave Access (WIMAX), Global System for Mobile Communication (GSM), Long Term Evolution (LTE), High Speed Packet Access (HSPA), or some other cellular wireless communication protocol to communicate with each of cellular networks 103-104. Wireless device 101 may use the same cellular protocol to communicate with cellular network 103 as wireless device 101 uses to communicate with cellular network 104 or may use a different protocol for each network.

Typically, even when using multiple wireless access points, wireless LAN 102 has a much smaller wireless coverage area than cellular networks 103-104. However, when wireless device 101 is within the coverage area of wireless LAN 102 it may be advantageous for wireless device 101 to exchange data communications with wireless LAN 102 rather than cellular networks 103-104. For example, wireless LAN 102 may provide faster data communications than can cellular networks 103-104, may not be subject to bandwidth usage limitations of cellular networks 103-104, may not be subject to bandwidth usage costs of cellular networks 103-

104, may provide access to services that are local to wireless LAN 102, or for any other reason.

Furthermore, when not located within the coverage area of wireless LAN 102, wireless device 101 may exchange data communications with one of cellular networks 103-104 over the other for similar reasons as those listed above for wireless LAN 102. Additionally, wireless device 101 may exchange communications with one cellular network over the other due to the wireless coverage area limitations of each cellular network 103-104, due to one cellular network having better signal strength, due to one cellular network requiring the use of less power of wireless device 101 to communicate, or for any other reason that one cellular network would be selected over another.

When wireless device 101 exchanges communications with data network 107, wireless device 101 is assigned an identifier, such as an IP address, that will direct data communications from data network 101 to wireless device 101. In particular, wireless LAN 102, control system 105, and control system 106 can each assign the identifier to wireless device 101 when wireless device 101 is accessing data network 107 through wireless LAN 102, cellular network 103, or cellular network 104, respectively. If wireless device 101 were to switch from communicating with wireless LAN 102 to communicating with one of cellular networks 103-104, then wireless device 101 would be assigned a new identifier by control system 105 or 106. Consequently, any data session communications from data network 107 directed to the identifier for wireless device 101 on wireless LAN 102 would be lost after wireless device 101 switches networks. The data session communications would be lost because the identifier assigned to wireless device 101 by wireless LAN 102 will no longer be able to direct data communications to wireless device 101.

Figure 2:
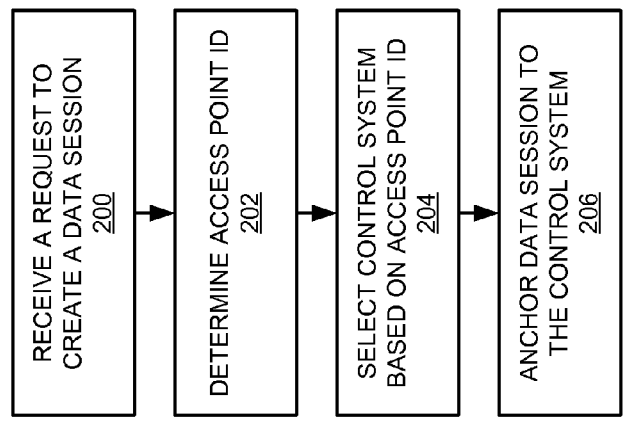
FIG. 2 illustrates the operation of the wireless communication system to provide data session continuity between wireless networks.

FIG. 2 illustrates the operation of wireless communication system 100 to provide data session continuity between wireless networks. The method described in FIG. 2 may be performed by control system 105, control system 106, or by some other control system located in cellular communication network 103, cellular communication network 104, data network 107, or elsewhere.

The operation begins when a request is received to create a data session for wireless device 101 exchanging communications with a wireless LAN 102 via a wireless access point (step 200). The request may be received when wireless device 101 registers with wireless LAN 102 in order to exchange data communications with data network 107. Accordingly, the data session may include all data communications exchanged over wireless LAN 102. Wireless device 101 may register with wireless LAN 102 automatically when entering the wireless coverage area, upon being directed to by a user of wireless device 101, upon a wireless LAN radio within wireless device 101 being activated, or for any other reason.

Alternatively, the request may be received at a point in time after wireless device 101 has registered with wireless LAN 102. Thus, the request may be received when a session for a particular data service is requested. The data session may be for any type of data service that can be provided to wireless device 101 over data network 107 and wireless LAN 102, such as web browsing, email, VoIP, audio, video, file transfer, or any other type of data service. The request in this example may have originated from wireless device 101 or from some other system, such as a service system on data network 107 that provides wireless device 101 with a service.

After receiving the request, an access point identifier is determined for the wireless access point (step 202). The access point identifier may identify the wireless access point individually, a group of wireless access points, or wireless LAN 102. For example, if wireless LAN 102 is a WIFI network, then the access point identifier may be a service set identifier (SSID) for the WIFI network. The access point identifier may be included in the request if the request originated from wireless device 101, requested from wireless device 101, requested from wireless LAN 102, or by any other method.

One of control systems 105-106 for cellular networks 103-104, respectively, is selected based on the access point identifier (step 204). Specifically, the location of wireless LAN 102 is identified from the access point identifier. The location may be identified from a data structure containing access point identifiers and corresponding locations. The location may be expressed in the form of geographic coordinates, address, city, state, county, zip code, or any other way of expressing a location.

Since wireless device 101 is communicating with wireless LAN 102, it can be assumed that the location of wireless LAN 102 is also the approximate location of wireless device 101. Thus, once the location of wireless LAN 102 is determined, it can then be determined which of cellular networks 103 and 104 will most likely exchange data communications with wireless device 101 when wireless device 101 stops exchanging data communications with wireless LAN 102.

Reasons for determining one cellular network over the other may include one cellular network does not provide sufficient wireless coverage at the location of wireless LAN 102, one cellular network provides faster data exchange speeds, one cellular network is preferred by wireless device 101, wireless device 101 does not have the radio necessary to communicate with one cellular network (or that radio is turned off), or for any other reason that one cellular network would be chosen over another.

The control system that is selected is the control system of control systems 105-106 that corresponds to which of cellular networks 103-104 is determined as being mostly likely to exchange data communications with wireless device 101 when wireless device 101 stops exchanging data communications with wireless LAN 102.

In some embodiments, selecting a control system may be simplified to querying a data structure that containing access point identifiers and a corresponding cellular network or, more specifically, control system that should be used at a location for each of the access point identifiers. The data structure may further include information about wireless device 101, such as cellular network preferences and cellular network capabilities, so that a control system can be selected that is best suited for wireless device 101 at the location.

Once the control system is selected, the data session is anchored to the control system (step 106). For the purposes of this example, control system 105 is selected as being most likely to exchange data communications with wireless device 101. To anchor the data session with control system 105, control system 105 configures itself to be an intermediate system between wireless LAN 102 and data network 107 on a path for data communications exchanged between wireless device 101 and data network 107 for the data session.

In one embodiment, the data session is anchored to control system 105 using the following process. Wireless LAN 102 assigns a first identifier to wireless device 101 for exchanging data communications. Control system 105 uses this identifier to direct communications to wireless device 101 via data network 107 and wireless LAN 102. Control system 105 assigns a second identifier to wireless device 101 for the data session. This second identifier is used by whatever system(s) on data network 107 to transfer data to wireless device 101 for the data session. Accordingly, the second identifier directs data session communications to control system 105 using the second identifier. Control system 105 then forwards the data session communications to wireless device 101 using the first identifier that was assigned by wireless LAN 102. Thus, any system that transfers data to wireless device 101 from data network 107 will transfer that data through control system 105. Similarly, wireless device 101 may direct any communications for the data session to the address of control system 105 so that control system 105 can act as an intermediary in the uplink direction as well.

After the data session is anchored, wireless device 101 may stop exchanging communications with wireless LAN 102 and start exchanging communications with cellular network 103 during the data session. For example, the user of wireless device 101 may move wireless device 101 from a building where wireless LAN 102 provides wireless network coverage. Having the data session anchored to control system 105 allows the data session to continue uninterrupted because data communications from wireless device 101 on cellular network 103 pass through control system 105 by default. Moreover, since data communications for the data session were already being routed through control system 105 from data network 107, control system 105 will still be able to forward those communications to wireless device 101 through cellular network 103 rather than wireless LAN 102.

Advantageously, the method presented in FIG. 2 allows the data session to be maintained when wireless device 101 stops communicating with wireless LAN 102 and starts communicating with cellular network 103 while in the middle of a data session.

In some embodiments, wireless LANs or cellular communication networks may exist along with additional control systems. Also, a single control system may function for multiple cellular networks rather than for a single cellular network as depicted in FIG. 1.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless LAN 102 and cellular communication networks 103-104 each comprise network elements that provide communications services to wireless device 101. Wireless LAN 102 and cellular communication networks 103-104 may comprise switches, wireless access nodes, Internet routers, network gateways, application servers, computer systems, communication links, or some other type of communication equipment—including combinations thereof.

Communication control systems 105-106 each comprise a computer system and communication interface. Communication control systems 105-106 may also include other components such a router, server, data storage system, and power supply. Communication control systems 105-106 may reside in a single device or may be distributed across multiple devices. Communication control systems 105-106 could be a packet data network gateway (PGW), home agent, mobile switching center, network gateway system, Internet access node, application server, service node, or some other communication system—including combinations thereof.

Data network 107 comprises network elements that provide communications services to wireless device 101. Data network 107 may comprise switches, wireless access nodes, Internet routers, network gateways, application servers, computer systems, communication links, or some other type of communication equipment—including combinations thereof.

Wireless links 111-113 use the air or space as the transport media. Wireless links 111-113 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 114-116 use metal, glass, air, space, or some other material as the transport media. Communication links 114-116 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 114-116 could be direct links or may include intermediate networks, systems, or devices.

Figure 3:
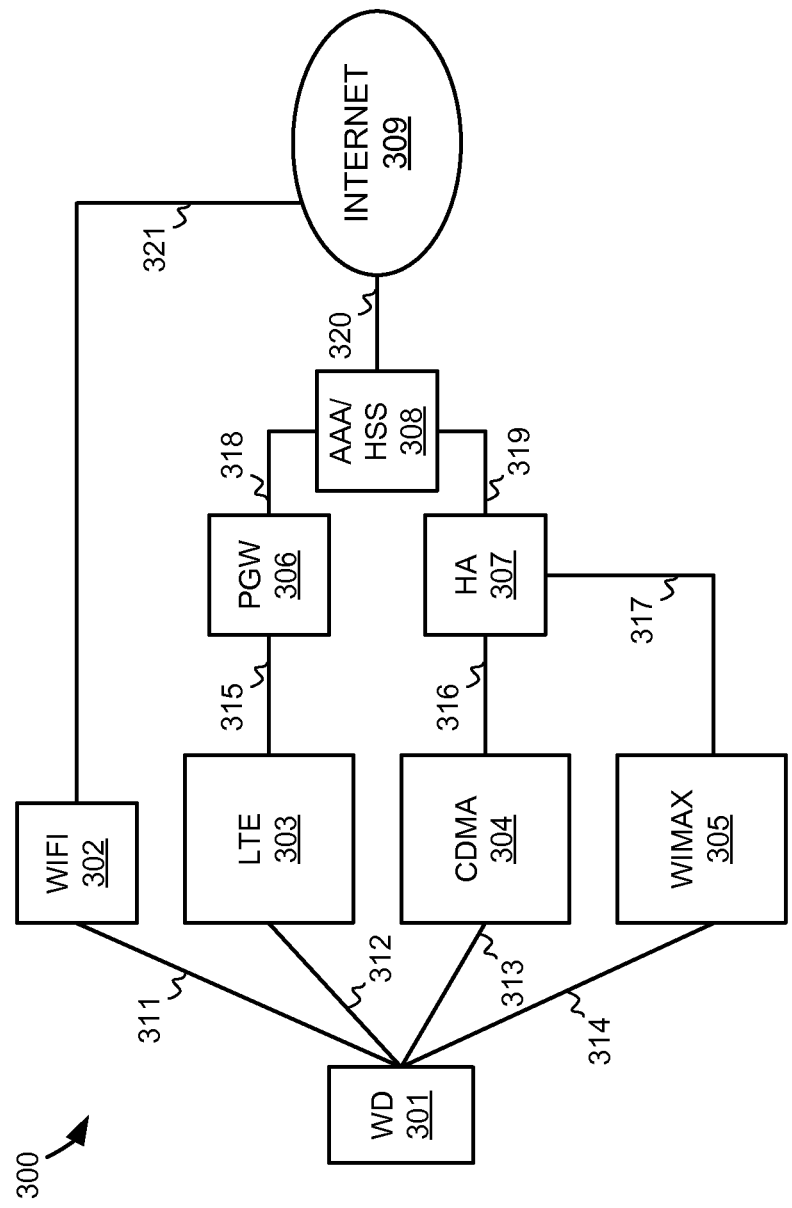
FIG. 3 illustrates a wireless communication system to provide data session continuity between wireless networks.

FIG. 3 illustrates wireless communication system 300. Wireless communication system 300 includes wireless communication device 301, WIFI network 302, LTE cellular network 303, CDMA cellular network 304, WIMAX cellular network 305, packet data network gateway (PGW) 306, home agent 307, authentication, authorization, and accounting server (AAA) or home subscriber server (HSS) 308, and Internet 309.

Wireless communication device 301 and WIFI network 302 communicate over wireless link 311. Wireless communication device 301 and LTE network 303 communicate over wireless link 312. Wireless communication device 301 and CDMA network 304 communicate over wireless link 313. Wireless communication device 301 and WIMAX network 305 communicate over wireless link 314. LTE network 303 and PGW 306 communicate over communication link 315. CDMA network 304 and home agent 307 communicate over communication link 316. WIMAX network 305 and home agent 307 communicate over communication link 317. PGW 306 and AAA/HSS 308 communicate over communication link 318. Home agent 307 and AAA/HSS 308 communicate over communication link 319. AAA/HSS 308 and Internet 309 communicate over communication link 320. WIFI network 302 and Internet 309 communicate over communication link 321.

In operation, WIFI network 302 covers a much smaller area than one of cellular networks 303-304. For example, an access node of WIFI network 302 may be capable of covering a single-family residence while a base station of cellular networks 303-305 may be able to cover an entire neighborhood where the residence is located and are based on technologies that allow communications to be handed off from one base station to another. Given the smaller coverage area of WIFI network 302, it is likely that wireless device 301 could leave the coverage area of WIFI network 302 and need to rely on one of cellular networks 303-305 for data communications.

Figure 4:
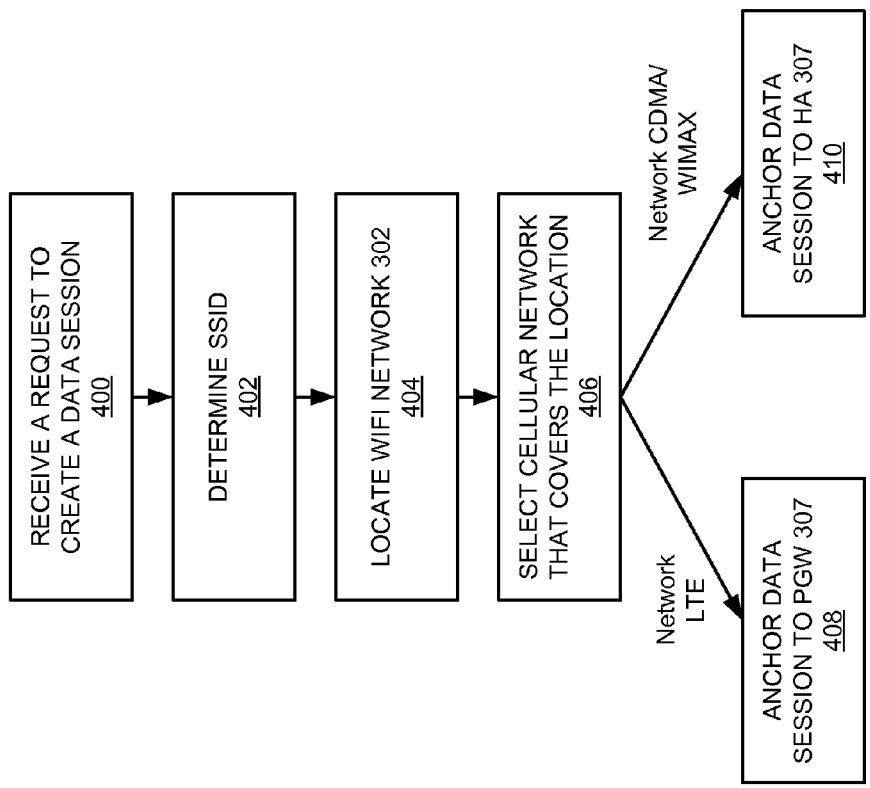
FIG. 4 illustrates the operation of the wireless communication system to provide data session continuity between wireless networks.

FIG. 4 illustrates the operation of wireless communication system 300 to provide data session continuity between wireless networks. AAA/HSS 308 receives a data session request from wireless device 301 (step 400). Wireless device 301 communicates with AAA/HSS 307 over Internet 309 via WIFI network 302. The data session request may be for any type of data service, such as web browsing, email, VoIP, audio, video, file transfer, etc.

AAA/HSS 308 determines the SSID of WIFI network 302 (step 402). The AAA/HSS 308 may determine the SSID by querying wireless device 301 or WIFI network 302 for the SSID, by receiving the SSID within the data session request or some other message from wireless device 301 or WIFI network 302, or by any other method that one system may determine information about another system.

AAA/HSS 308 then determines the location of WIFI network 302 (step 404). The location may be expressed in the form of geographic coordinates, address, city, state, county, zip code, or any other way of expressing a location. AAA/HSS 308 may have access to a data structure that includes WIFI network SSIDs and a corresponding location to each SSID or may use some other method of determining the SSID.

After determining the location of WIFI network 302, AAA/HSS 308 selects a cellular network that serves the location of WIFI network 302 (step 406). AAA/HSS 308 may use various criteria for selecting the cellular network including strength of wireless signal for each cellular network at the location, data speed provided by each cellular network, whether wireless device 301 is configured to access each cellular network, cellular network preferences for wireless device 301, or any other criteria that may be useful when selecting a cellular network—including combinations thereof.

Once the cellular network is selected, AAA/HSS 308 anchors the data session to the data communication management system for the chosen cellular network. Accordingly, if LTE network 303 is chosen, then AAA/HSS 308 anchors the data session to PGW 307 (step 408). If either CDMA network 304 or WIMAX network 305 is chosen, then AAA/HSS 308 anchors the data session to home agent 307 (step 410). While FIG. 3 illustrates that AAA/HSS 308 is an intermediate system on data paths between Internet 309 and both PGW 306 and home agent 307, PGW 306 and home agent 307 may communicate with Internet 307 without AAA/HSS 308 acting as an intermediate system.

It should be understood that the data session request received in step 400 does not necessarily need to be received before anchoring. Rather, steps 402-410 may occur at a time before wireless device 301 requests a data session. Steps 402-410 may therefore occur at the time wireless device 301 registers with WIFI network 302 or at some time after registering. For example, upon registering with WIFI network 302, AAA/HSS 308 is notified that wireless device 301 needs an anchor. The notification may come in the form of a message from wireless device 301 indicating the SSID of WIFI network 302. Once that message is received, AAA/HSS 302 performs steps 402-410. After those steps are performed, wireless device 301 makes the data session request via WIFI network 302 and the data session request is serviced at the already selected anchor point.

Figure 5:
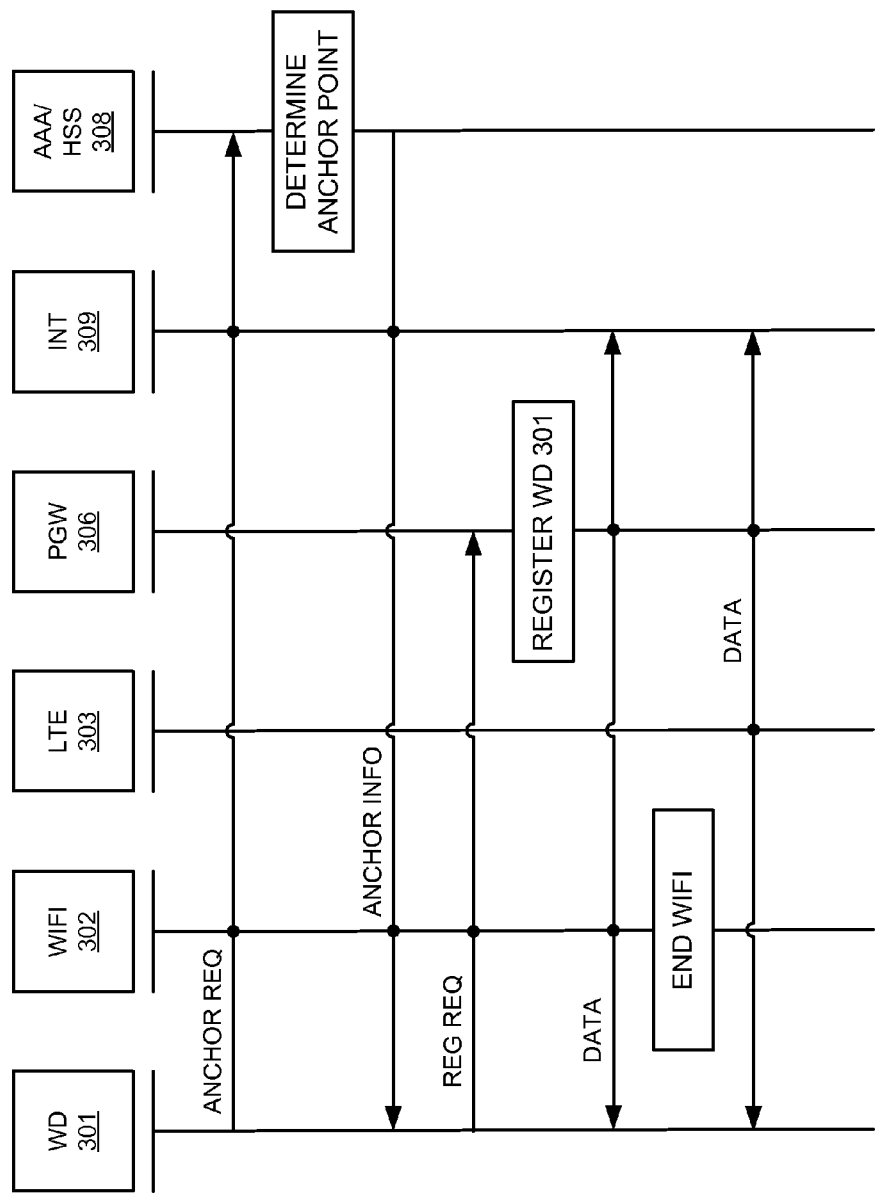
FIG. 5 illustrates the operation of the wireless communication system to provide data session continuity between wireless networks.

FIG. 5 is a sequence diagram illustrating the operation of wireless communication system 300 to provide data session continuity between wireless networks. The sequence begins with wireless device 301 transferring an anchor request to AAA/HSS 308. The anchor request may be to start a data session, such as a web page request, email inbox fetch, media download, etc., or may simply indicate to AAA/HSS 308 that wireless device 301 is requesting an anchor for a data session that will occur after the anchor has been assigned. The anchor request is transferred to Internet 309 via WIFI network 302 that provides wireless device 301 with access to Internet 309.

Wireless device 301 transfers the SSID of WIFI network 302 along with the data session request.

Upon receiving the anchor request with the SSID, AAA/HSS 308 references SSID anchor table 700, shown in FIG. 7, to determine an anchor point for wireless device 301. SSID anchor table 700 lists a number of SSIDs in a first column and an anchor system for each SSID in a second column. In this example, the SSID of WIFI network 302 is 'B' and SSID anchor table 700 indicates that PGW 306 should be the anchor. Table 700 may list PGW 306 because LTE network 303 is the fastest data network that covers the location where WIFI network 302 is located.

In some embodiments, SSID anchor table 700 may further include a location corresponding to each SSID, whether another anchor is available, or any other information that may be pertinent when determining an anchor point. For example, wireless device 301 may further indicate, or AAA/HSS 308 otherwise determines, radio network capabilities of wireless device 301. In particular, wireless device 301 may not have a radio capable of connecting to LTE network 303 or does not have that radio functioning at the time of the data session request. In that case, though table 700 provides that PGW 306 as the anchor point for SSID 'B', AAA/HSS 308 will determine that home agent 307 should be the anchor rather than PGW 306, which is a control system for a network wireless device 301 is unable to access.

Continuing with the sequence of FIG. 5, AAA/HSS 308 transfers anchor information to wireless device 301 indicating that PGW 306 is the anchor for data sessions from wireless device 301. The anchor information may include an IP address for PGW 306 to which wireless device 301 will direct data session traffic. AAA/HSS 308 may further transfer a message to PGW 306 that notifies PGW 306 that wireless device 301 will be using PGW 306 as an anchor.

Upon receiving the anchor information, wireless device 301 uses the anchor information to register with PGW 306. Wireless device 301 transfers a registration message to PGW 306. In response to receiving the registration message, PGW 306 registers wireless device 301 so that PGW 306 can act as an intermediate system on the communication path between wireless device 301 and service systems on Internet 309. After registering with PGW 306, wireless device 301 can exchange data communications with systems over Internet 309 via WIFI network 302 and PGW 306. To perform as an anchor system, PGW 306 may handle data communications from wireless device 301 to a system on Internet 309 in the same manner that PGW 306 would if PGW 306 received the data communications from wireless device 301 over LTE network 303. However, instead of routing data communications directed to wireless device 301 over LTE network 303, PGW 306 routes those communications to the IP address of wireless device 301 on WIFI network 302.

In a particular example, wireless device 301 requests a streaming video from a streaming video system having an IP address. The data request for the streaming video at the video system's IP address is transferred in a message directed to the IP address of PGW 306. Upon receipt of the data session request, PGW 306 forwards the data session request on to the IP address of the video system. The video system responds to the request by transferring the streaming video data to PGW 306, which then forwards the streaming video data to wireless device 301 on WIFI network 302 based on an identifier for wireless device 301 on WIFI network 302.

During the transfer of the streaming video, wireless device 301 stops communicating with WIFI network 302. This may be caused by wireless device 301 leaving the coverage area of WIFI network 302, by shutting off the WIFI radio of wireless device 301, a malfunction of WIFI network 302, or for any other reason. Wireless device 301 then connects to LTE network 303 to continue exchanging data communications. Since wireless device 301 is already registered with PGW 306, PGW 306 will recognize that wireless device 301 left WIFI network 302 and begin transferring the video data over LTE network 303 to wireless device 301 rather than over WIFI network 302.

If, however, wireless device 301 connects to either CDMA network 304 or WIMAX network 305 to exchange communications, then the video data session will be lost because data communications for wireless device 301 were not anchored with home agent 307. Wireless device 301 will therefore need to reestablish the video data session through home agent 308.

Figure 6:
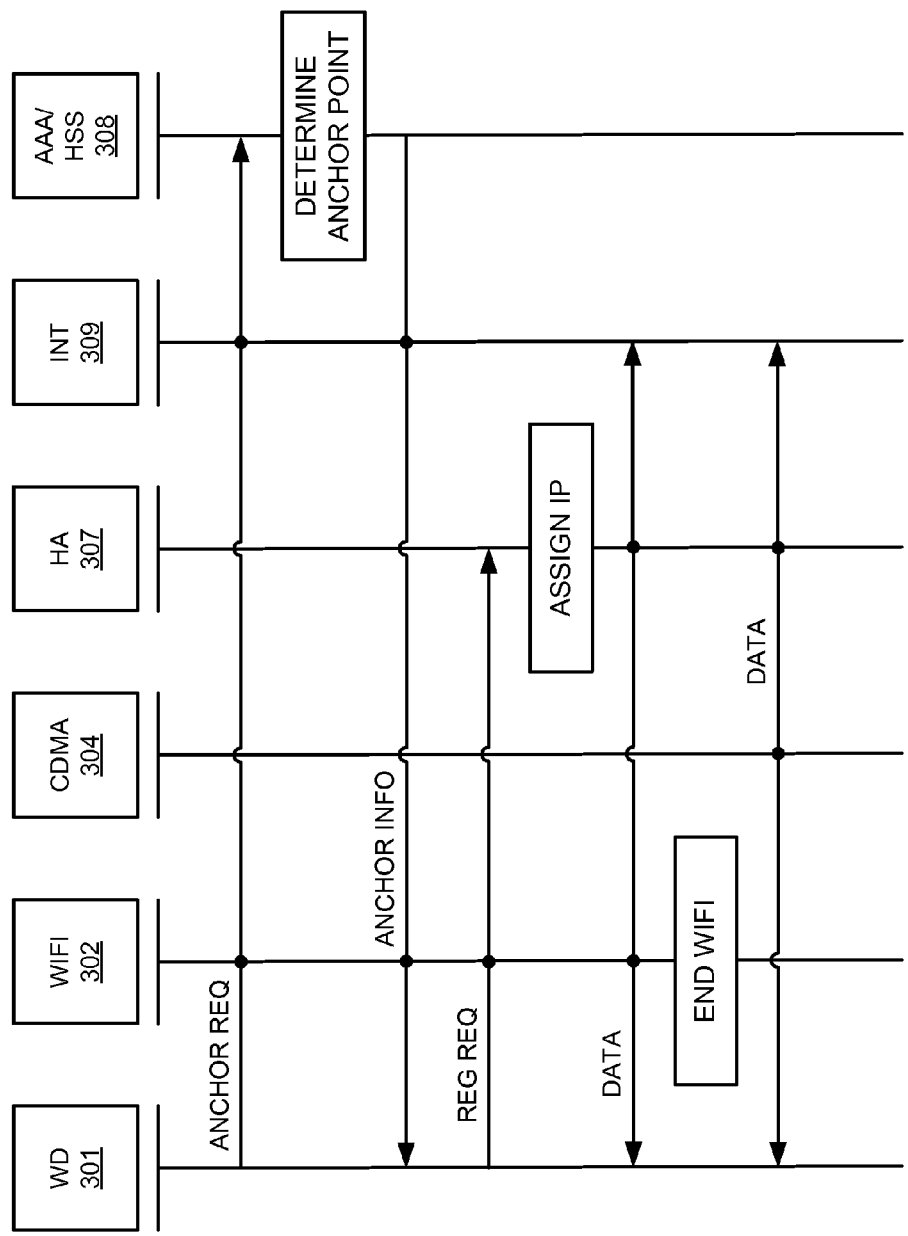
FIG. 6 illustrates the operation of the wireless communication system to provide data session continuity between wireless networks.

FIG. 6 is a sequence diagram illustrating the operation of wireless communication system 300 to provide data session continuity between wireless networks. The sequence begins with wireless device 301 transferring an anchor request to AAA/HSS 308. The anchor request may be to start a data session, such as a web page request, email inbox fetch, media download, etc., or may simply indicate to AAA/HSS 308 that wireless device 301 is requesting an anchor for a data session that will occur after the anchor has been assigned. The anchor request is transferred to Internet 309 via WIFI network 302 that provides wireless device 301 with access to Internet 309. Wireless device 301 transfers the SSID of WIFI network 302 along with the data session request.

Upon receiving the anchor request with the SSID, AAA/HSS 308 references SSID anchor table 700, shown in FIG. 7, to determine an anchor point for wireless device 301. SSID anchor table 700 lists a number of SSIDs in a first column and an anchor system for each SSID in a second column. In this example, the SSID of WIFI network 302 is 'C' and SSID anchor table 700 indicates that home agent 307 should be the anchor. Table 700 may list home agent 307 because CDMA network 304 is the only cellular network available at the location of WIFI network 302.

AAA/HSS 308 then transfers anchor information to wireless device 301 indicating that home agent 307 is the anchor for data sessions from wireless device 301. The anchor information may include an IP address for home agent 307 to which wireless device 301 will direct data session traffic. AAA/HSS 308 may further transfer a message to home agent 307 that notifies home agent 307 that wireless device 301 will be using home agent 307 as an anchor.

Upon receiving the anchor information, wireless device 301 uses the anchor information to register with home agent 307. Wireless device 301 transfers a registration message to home agent 307. In response to receiving the registration message, home agent 307 registers wireless device 301 so that home agent 307 can act as an intermediate system on the communication path between wireless device 301 and service systems on Internet 309. After registering with home agent 307, wireless device 301 can exchange data communications with systems over Internet 309 via WIFI network 302 and home agent 307. To perform as an anchor system, home agent 307 may handle data communications from wireless device 301 to a system on Internet 309 in the same manner that home agent 307 would if home agent 307 received the data communications from wireless device 301 over CDMA network 304. However, instead of routing data communications directed to wireless device 301 over CDMA network 304, home agent 307 routes those communications to the IP address of wireless device 301 on WIFI network 302.

In a particular example, wireless device 301 requests a voice over IP (VoIP) call to a destination on Internet 309. The call request is transferred in a message directed to the IP address of home agent 307. Upon receipt of the call request, home agent 307 forwards the call request on to the IP address of the destination. The destination responds to the request by transferring a response to the request and any other call data from thereon to home agent 307, which then forwards the call data to wireless device 301 on WIFI network 302. Furthermore, any call data transferred from wireless device 301 is transferred to the destination through home agent 307 in a manner similar to that used for the call request.

During the exchange of call communications, wireless device 301 stops communicating with WIFI network 302. This may be caused by wireless device 301 leaving the coverage area of WIFI network 302, by shutting off the WIFI radio of wireless device 301, a malfunction of WIFI network 302, or for any other reason. Wireless device 301 then connects to CDMA network 304 to continue exchanging data communications. Since wireless device 301 is already registered with home agent 307, home agent 307 will recognize that wireless device 301 left WIFI network 302 and begin transferring call data over CDMA network 304 to wireless device 301 rather than over WIFI network 302.

Figure 8:
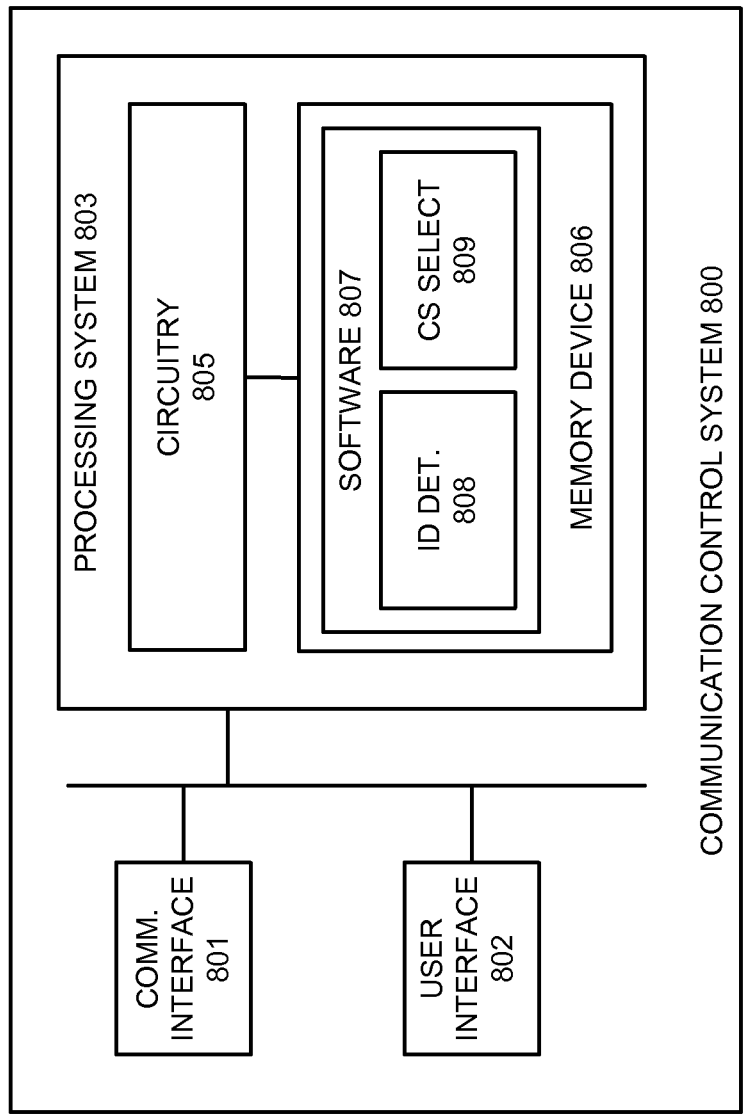
FIG. 8 illustrates a communication control system to provide data session continuity between wireless networks.

FIG. 8 illustrates communication control system 800. Communication control system 800 is an example of the communication control system discussed with respect to FIG. 2 or AAA/HSS 308, although the control system and AAA/HSS 308 may use alternative configurations. Communication control system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software includes identifier determination module 808 and control system selection module 809. Operating software 807 may further include an operating system, utilities, drivers, network interfaces, applications, or some other type of software. When executed by circuitry 805, operating software 807 directs processing system 803 to operate communication control system 800 as described herein.

In particular, operating software 807 directs processing system 803 to receive a request via communication interface 801 to create a data session for a wireless communication device exchanging communications with a wireless local area network via a wireless access point. Identifier determination module 808 directs processing system 803 to determine an access point identifier for the wireless access point. Control system selection module 809 directs processing system 803 to select a control system for a cellular communication network of a plurality of cellular communication networks based on the access point identifier and anchor the data session to the control system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
    in a Wireless Fidelity (WiFi) network, receiving an internet access request from a wireless communication device and responsively transferring an anchor request to a Long Term Evolution (LTE) network;
    in the LTE network, receiving the anchor request and responsively processing a WiFi network identifier to select an LTE Packet Gateway (PGW) and obtaining an internet address for the wireless communication device;
    in the WiFi network and the LTE network, exchanging first user data between the wireless communication device and an internet through the LTE PGW using the internet address;
    in the LTE network, after the wireless communication device terminates communications with the WiFi network, exchanging second user data between the wireless communication device and the internet through the LTE P-GW using the internet address but not the WiFi network.

2. The method of claim 1 wherein the internet address used to exchange the first user data and the internet address used to exchange the second user data comprise a same internet address.

3. The method of claim 1 wherein the WiFi network identifier comprises a Service Set Identifier (SSID).

4. The method of claim 1 wherein processing the WiFi network identifier to select the LTE Packet Gateway (PGW) comprises translating the WiFi network identifier into a geographic location of the WiFi network and translating the geographic location into a PGW identifier.

5. The method of claim 1 wherein processing the WiFi network identifier to select the LTE Packet Gateway (PGW) comprises translating a Service Set Identifier (SSID) for the WiFi network into a PGW identifier.

6. The method of claim 1 further comprising, in the LTE network, processing a wireless communication device identifier in addition to the WiFi network identifier to select the LTE Packet Gateway (PGW).

7. The method of claim 1 wherein the wireless communication device terminates communications with the WiFi network in response to leaving WiFi network coverage.

8. The method of claim 1 wherein the wireless communication device terminates communications with the WiFi network in response to a user instruction to disable a WiFi transceiver.

9. The method of claim 1 wherein the first user data and the second user data comprise a voice session.

10. The method of claim 1 wherein the first user data and the second user data comprise a video session.

11. A wireless communication system, comprising:
    a Wireless Fidelity (WiFi) network configured to receive an internet access request from a wireless communication device and responsively transfer an anchor request to a Long Term Evolution (LTE) network;
    the LTE network configured to receive the anchor request and responsively process a WiFi network identifier to select an LTE Packet Gateway (PGW) and obtain an internet address for the wireless communication device;
    the WiFi network and the LTE network configured to exchange first user data between the wireless communication device and an internet through the LTE PGW using the internet address;
    the LTE network configured, after the wireless communication device terminates communications with the WiFi network, to exchange second user data between the wireless communication device and the internet through the LTE P-GW using the internet address but not the WiFi network.

12. The wireless communication system of claim 11 wherein the internet address used to exchange the first user data and the internet address used to exchange the second user data comprise a same internet address.

13. The wireless communication system of claim 11 wherein the WiFi network identifier comprises a Service Set Identifier (SSID).

14. The wireless communication system of claim 11 wherein the LTE network is configured to translate the WiFi network identifier into a geographic location of the WiFi network and translate the geographic location into a PGW identifier.

15. The wireless communication system of claim 11 wherein the LTE network is configured to translate a Service Set Identifier (SSID) for the WiFi network into a PGW identifier.

16. The wireless communication system of claim 11 wherein the LTE network, is configured to process a wireless communication device identifier in addition to the WiFi network identifier to select the LTE Packet Gateway (PGW).

17. The wireless communication system of claim 11 wherein the wireless communication device terminates communications with the WiFi network in response to leaving WiFi network coverage.

18. The wireless communication system of claim 11 wherein the wireless communication device terminates communications with the WiFi network in response to a user instruction to disable a WiFi transceiver.

19. The wireless communication system of claim 11 wherein the first user data and the second user data comprise a voice session.

20. The wireless communication system of claim 11 wherein the first user data and the second user data comprise a video session.

* * * * *